United States Patent [19]
Reynolds et al.

[11] Patent Number: 5,939,475
[45] Date of Patent: *Aug. 17, 1999

[54] ORGANIC FLUID SYSTEMS CONTAINING CLAY/POLYAMIDE COMPOSITIONS

[75] Inventors: William Reynolds, Barnegat, N.J.; Glen Hawthorne, Louisville, Ky.

[73] Assignee: Rheox, Inc., Hightstown, N.J.

[*] Notice: This patent is subject to a terminal disclaimer.

[21] Appl. No.: 08/697,970

[22] Filed: Sep. 3, 1996

[51] Int. Cl.$^6$ .............................. C08K 3/34; C08K 5/20; B01J 13/00; C09K 7/06
[52] U.S. Cl. ................................. 524/230; 260/DIG. 38; 507/133; 507/901; 508/136; 510/418; 510/507; 516/31; 524/445; 524/923
[58] Field of Search ................................ 252/309, 315.2; 507/901, 133; 524/445, 923, 230; 260/DIG. 38; 508/136; 510/418, 507

[56] References Cited

U.S. PATENT DOCUMENTS

| | | | |
|---|---|---|---|
| 2,531,825 | 11/1950 | Peterson et al. | 510/507 X |
| 2,622,987 | 12/1952 | Ratcliffe | 106/20 B |
| 4,031,048 | 6/1977 | Holmen et al. | 524/923 X |
| 4,208,218 | 6/1980 | Finlayson | 252/315.2 X |
| 4,287,086 | 9/1981 | Finlayson et al. | 252/315.2 |
| 4,508,868 | 4/1985 | Whyzmuzis et al. | 260/DIG. 38 |
| 4,571,267 | 2/1986 | Drawert et al. | 260/DIG. 38 |
| 4,655,836 | 4/1987 | Drawert et al. | 260/DIG. 38 |
| 4,778,843 | 10/1988 | Cooperman et al. | 524/606 |
| 5,349,011 | 9/1994 | Reichert et al. | 524/602 |
| 5,591,793 | 1/1997 | Rao et al. | 524/445 X |
| 5,718,841 | 2/1998 | Mardis et al. | 252/309 |

*Primary Examiner*—Richard D. Lovering
*Attorney, Agent, or Firm*—Michael J. Cronin

[57] ABSTRACT

A novel pourable organophilic clay polyamide composition useful as a rheological additive for organic fluid system comprising a) from about 5 to 15 weight percent of an organophilicly modified smectite-type clay, b) from about 25 to about 35 weight percent of one or more rheologically active polyamides and c) from about 40 to 60 weight percent of one or more organic solvents preferably selected from the group consisting of n-propanol, toluene and mineral spirits.

The organophilic clay polyamide composition is used in non-aqueous fluid systems such as paints, inks, and coatings to provide improved rheological properties to the system.

8 Claims, No Drawings

5,939,475

ORGANIC FLUID SYSTEMS CONTAINING CLAY/POLYAMIDE COMPOSITIONS

BACKGROUND OF THE INVENTION

1. Brief Description of the Field of the Invention

The present invention relates to an improved rheological composition for organic systems which is in a pumpable or pourable liquid form at ambient temperatures. Such an additive provides improved viscosity control and a variety of other rheological properties to many types of organic systems without adverse environmental and other effects. The present invention also relates to a thickened composition or fluid system containing the new rheological composition.

The present invention particularly relates to novel pumpable or pourable organophilic clay/polyamide compositions which are dispersible in organic or solvent-based (i.e., non-aqueous) fluids to provide improved ease of incorporation and a wide variety of rheological, viscosity and flow control properties to such fluids. Such organic fluids include paints and coatings as well as oil-based drilling fluids, inks and adhesives. The invention also pertains to a process for preparing these novel composition. The invention also includes organic fluids containing such novel compositions as rheological additives.

2. Description of the Prior Art

The art has long investigated and sought chemical materials, referred to as thixotropes, rheological additives, rheological control agents and thickeners, which are used as additives to control the rheological properties of various liquid organic compositions. Examples of commercially significant liquid organic compositions include inks, paints, coatings and drilling fluids for oil well drilling operations. It has been generally conceded that to be effective, especially for paints and coating compositions, such rheological control agents should provide desired and controllable rheological characteristics to the liquid systems in which they are used. In organic paints and coatings, for instance, the thickener can provide viscosity modification, improved stability and pigment suspension, and improved application properties. In this regard, organophilic clays, as discussed hereafter, have been shown to be useful to thicken various organic and solvent-based compositions. Fumed silica and precipitated silica have also been used to thicken certain types of organic compositions.

Organic and solvent-based fluids include organic, solvent and alkyd-based paints, coatings, inks, construction materials, cosmetics, and wood stains utilized in various and numerous aspects of a consumer-based industrial society. Depending on the composition of the fluid systems, the products made with these thickeners can be useful as decorative and protective coatings, including paper coatings, inks, sealants, adhesives, petroleum drilling fluids, completion fluids, and the like.

It has been known since the mid 1940's that organophilic clays, often referred to as organoclays, could be used to provide various rheological properties to a variety of organic liquid compositions. Organophilic clays are modified smectite-type clays prepared by the reaction of an organic cation, usually a quaternary ammonium chloride compound, with a smectite-type clay utilizing various processes now well known in the art. Smectite clays, while dispersible in water, are not dispersible in organic fluids. If the organic cation contains at least one fatty acid group with preferably 10 or more carbon atoms, such "reaction-product" organoclays have the ability of dispersing into, and modifying the viscosity of, organic liquids. Such organoclays, over the last fifty years, have found an ever-increasing market imparting thickening or rheological properties to an increasingly wide number of such systems, including paints, inks, coatings, adhesives, drilling fluids and similar fluids.

Representative U.S. Pat. No. 4,664,820, issued to the assignee hereof, describes the preparation of organophilic clays, some of which have become commercial products, that are used to thicken organic systems. Such organoclays may function to thicken both polar or non-polar solvents, depending on the substitutents on the organic cation. For purposes of this patent, organic and solvent are used to mean essentially the same thing. Dr. J. W. ("Spike") Jordan, a new retired senior scientist employed by the assignee hereof, in "Proceedings of the 10th National Conference on Clays and Clay Minerals" (1963), discusses a wide range of applications, as then known, of such organoclays from high polarity organic liquids to low polarity solvent liquids.

Organophilic clay gellants have been developed since 1963 which are the reaction products of smectite-type clays with certain organic cations or mixtures of organic cations, and organic anions or anion combinations. These organoclays have the advantage of being easily dispersible in particular types of organic and solvent compositions without the need for a dispersion aids or polar activators under normal factory dispersion conditions. Illustrative patents which describe such improved organophilic clays are U.S. Pat. Nos. 4,105,578; 4,208,218; 4,412,018; 4,450,095; and 4,517,112.

More recent U.S. patents issued to assignee hereof show various uses of organoclays and processing improvements in making such organoclays using conventional quatemized, nitrile-derived ammonium compounds. These patents include U.S. Pat. Nos. 5,034,136; 5,075,033; and 5,151,155. See also U.S. Pat. No. 5,336,647 and U.S. Pat. No. 5,429, 999. U.S. Pat. No. 5,336,647 in some length details the constituents of specific quaternary compounds useful in making commercial organoclays known as of its filing date.

Some of the problems of use, dispersibility and reduction of gloss associated with solid particulate types of thickeners such as organoclays and silica are overcome with the use of polyamide rheological additives. For example, U.S. Pat. No. 4,778,843 describes a polyamide rheological additive especially designed for organic solvent-based compositions, which comprises the reaction product of polycarboxylic acid, an active hydrogen compound of a specified carbon chain length and structure, and a monocarboxylic acid capping agent, wherein the additive exhibits excellent efficiency and dispersibility and is effective when predispersed in an organic solvent. Recent U.S. Pat. No. 5,349,011 to the assignee hereof describes a polyamide-ester rheological additive, especially for organic solvent-based compositions, which comprises the reaction product of polycarboxylic acid, an active hydrogen composition of a specified structure, an alkoxylated polyol, and a monocarboxylic acid capping agent. Said additive exhibits excellent efficiency and ease of dispersibility for aliphatic solvent-based coating compositions, and is effective when dispersed into a solvent.

U.S. Pat. No. 5,034,444 describes an anti-sag additive for non-aqueous coating compositions which is the reaction product of an alkoxylated aliphatic nitrogen-containing compound, an aliphatic diamine or mixtures thereof, and an organic polycarboxylic anhydride or acid, an alkanediol polyepoxide ether or mixtures thereof. The additive provides excellent anti-sag and storage stability properties, particularly for high solids coating compositions, without causing a significant increase in viscosity.

Disadvantages of Current Additives

There are drawbacks with the use of organically modified clays and polyamide additives for thickening organic compositions. Since both organically modified clays and polyamides are most often in solid, often particulate, form when they are prepared, these materials generally must be added as solids or powders during the grind stage of manufacture of the organic fluids to be thickened. Additionally, dusting problems are associated with the use of organically—modified clays during manufacturing and use—problems as to dust are similar to those encountered when using fumed silica. Organoclays as prepared are difficult to handle because of their fineness, small particle size and relatively low density. In addition, the use of these types of additives has led, in some cases, to a loss of gloss in the cured paint or coating. Furthermore, such additives exhibit extremely rapid recovery following shear, thereby limiting the leveling or smoothness of the applied composition.

The dispersion of a solid rheological thickener additive is critical to activation of such thickener. Rheological effectiveness is a direct function of proper dispersion into the organic system to be thickened. Problems associated with the use of solid thickeners, however, include poor dispersibility. Moreover, when added to systems, solid thickeners by their very nature tend to agglomerate to form clumps. Agglomeration can be reduced in many cases by adding the thickener to the system with agitation. Dissolution can be very slow, and can adversely affect the efficiency of specific organic fluid manufacturing operations.

Particularly in formulations comprising other chemicals and ingredients, extended agitation and aging periods are required before proper incorporation is attained. This requires users and formulators to develop crude empirical methods for estimating the final rheological properties of their fluid formulations.

For the above reasons, manufacturers have long separately searched for a fast, effective and simple way of incorporating both organoclays and polyamide-type thickeners into organic and other fluid systems. To satisfy this desire, as mentioned, some solid organoclays are today sold as rheological additives for paint and other compositions in a non-solid form. For example, organoclays have sometimes been sold as gels, where the organoclay at a very low loading of around 5–10% is dispersed into an organic medium to prepare a gel-like rheological additive composition, in order to avoid the need to use a solid organoclay thickener. A variety of different solvents and oils have been used including lanolin, castor oil, xylene, mineral oil and mineral spirits as organic media for this purpose. Such commercial non-solid form organoclay thickening compositions are prepared by dispersing a small amount of organoclay into the organic medium to form a non-solid mixture often called a "mastergel". The "mastergel" is then scouped or shovelled into paint and ink systems by the manufacturer. This "master gel" mixture usually can contain only about 5 to 10% organoclay and still remain useable.

Some solid polyamide rheology additives have had a similar history of being dispersed at low percent loadings into a variety of organic solvents to form a non-solid rheological additive composition. These organic solvents had to be chosen carefully with only a very narrow solubility range of solvent blends useable, which range had to be precisely determined and followed. An example of a solvent commercially used for polyamides was a blend of cyclohexanol and an aromatic solvent, commercially designated Aromatic 150. The reason for the utilization of such an organic solvent was to lower the viscosity of the solid polyamide rheological additive, which is itself non-pourable and solid, to provide ease in handling.

Similar problems of poor dispersibility and undesirably long dissolution times associated with the use of solid organoclays in organic systems have occurred in connection with the rheological modification of aqueous systems. However, a large number of methods have been utilized to solve these problems in aqueous systems which are not adaptable to organic systems.

A pourable thickening composition would eliminate many of the above-described problems, while having the desired advantages that pourable products would bring to coating manufacturers. The manufacture of a pourable thickener composition, which would be up to 40% to 60% active, containing a very reduced amount of organic solvent, has been preceived heretofore as presenting daunting technical difficulties that led many scientists to believe that it might be near to impossible to achieve. Rheological additives must provide high levels of viscosity or thickness to systems, which prior to such addition are much less viscous. The rheological additives must be efficient—when added at very small relative weight levels—and must, therefore, have the ability to impart significant increases in viscosity to much larger volumes of the organic fluid systems. Rheological additives in fact often must impart to systems at very low shear rates a behavior that approaches that of a solid. These requirements led some scientists to conclude incorrectly that such additives must themselves have very high viscosity levels, and that they must be either solid or solid-like. A rheological additive, which could be pourable, and could at a 30 to 50% concentration be similar in viscosity to the system to be thickened (where it would be present at a level of around 2% or less) appeared to many manufacturers, including their technical and purchasing employees, to be both a chemical and a physical impossiblity.

Consequently, despite the numerous types of rheological additives known in the art, research has been independently and simultaneously conducted toward both high active component thickeners that are in pourable, pumpable forms, and which are highly efficient and are readily dispersible in the composition to be thickened; and, in addition, rheological additives which overcome the deficiencies associated with prior art solvent-mixed thickeners.

OBJECT AND SUMMARY OF THE INVENTION

Objects of the Invention

It is a object of the instant invention to provide a pumpable rheological organoclay/polyamide thickening composition wherein the active rheological components of the thickening composition are up to 60% of the composition.

It is a specific object of the present invention to provide up to a 40%–60% active component rheological composition in pumpable form, which composition is efficient in providing thickening and rheological properties to organic fluid systems.

It is further object of the present invention to provide a rheological thixotrope in an easily pourable or pumpable form, which is pumpable at ambient temperatures for use in organic fluid systems including inks, paints, epoxies, polyesters and coatings.

It is a still further object of the present invention to provide a pourable, pumpable rheological composition that can be readily dispersed in the organic fluid system to be thickened.

SUMMARY OF THE INVENTION

In an important aspect, the present invention relates to a pumpable organophilic clay/polyamide composition useful as a rheological additive for organic fluid systems comprising:

a) from about 5 to 15 weight percent of an organophilicly modified smectite-type clay, b) from about 25 to about 35 weight percent of one or more rheologically active polyamides and c) from about 40 to 60 weight percent of one or more organic solvents selected from the group consisting of low molecular weight alcohols such as n-propanol, and aromatic solvents such as toluene and mineral spirits.

The inventive composition of the instant invention is in a pumpable, easily handleable form and contains a high level of two rheologically active chemicals which can be used by a manufacturer of paints and coatings both before and after the "grind" stage of such manufacture. The composition can be used as a rheological additive both for pre- and post-correction viscosity control—after the paint system has been largely made. The inventive composition also provides significant anti-settling properties to organic fluids containing resins and pigments, including providing such systems with extended shelf life. Substantially no settling can occur in such organic fluids for periods as long as six month by use of this invention.

Description of the Preferred Embodiments

As stated above, one component of the present composition invention, component a), is an organophilic clay. These organophilic clays are prepared by reacting a smectite-type clay with an organic cation or cations provided by specific quaternized ammonium compounds.

The clays used to prepare the organophilic clays of this invention are cation-exchangeable smectite clays which have a cation exchange capacity of about 75 or greater milliequivalents per 100 grams of clay, 100 percent active basis (beneficiated and essentially free of non-clay impurities). Smectite-type clays are well-known in science, geology and in the art of rheological additives, and are commercially available from a variety of sources both in the United States and throughout the world. They are unique among clays in that they exhibit the phenomena of swelling to many times their size when contacted with water.

Chemical formula descriptions of representative natural smectite clays useful in accordance with the present invention are as follows:

Hectorite

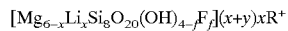

where $0.57 \leq x \leq 1.15$, $0<y<1$, $10$, $f \leq 4$ and R is selected from the group consisting of Na, Li, $NH_4$, and mixtures thereof;

Bentonite

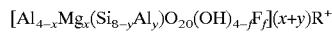

where $0<x<1.10$, $0<y<1.10$, $0.55 \leq (x+y) \leq 1.10$, $f \leq 4$ and R is selected from the group consisting of Na, Li, $NH_4$ and mixtures thereof, Types of clays considered applicable for best practice in the present invention can also be grouped in general as three-layer types (sheet structures composed of two layers of silica tetrahedrons and one central dodecahedral or trioctahedral) as follows:

1. Expanding lattice clays.
    a. Equidimensional smectite-type clays, including bentonite and montmorillonite.
    b. Elongated smectite clays including saponite.
2. Nonexpanding lattice clays including mixed-layer types (ordered stacking of alternate layers of different types);
3. Some clays which by their generic reference fit into more than one of the above-described classification groups. "Generic reference" clays all have the common characteristics of mineral containing aluminum or magnesium silicate: the major examples are 1) bentonite, and 2) hectorite.

Cation-exchangeable clays can also be synthesized, usually from a montmorillonite base clay, so as to possess certain chemical and physical characteristics in order to make such clays valuable in the practice of the present invention.

The above-described clays, especially the bentonite-type clays, are preferably converted to the sodium form if they are not already in this form. Commercially important representatives of such smectite clays used to make the organoclays of this invention are sodium and calcium bentonite and hectorite. Smectite-type clays prepared synthetically by either a pneumatolytic or, preferably, a hydrothermal synthesis process may also be used to prepare the novel products of this invention.

The most preferred commercially-available clays used in the present invention are bentonite, particularly Wyoming bentonite, with sodium bentonite preferred, and hectorite, particularly hectorite from Hector, Calif. in the Mojave Desert. Bentonite and hectorite clays have high bonding power and react easily with the specific organic quaternary ammonium compounds described hereinafter.

In addition, it will be understood that the above-listed smectite-type clays which have been subjected to the application of shear may also be used to make the organoclays of the instant invention. To achieve shearing of the smectite-type clay, the clay is typically dispersed in water at a concentration of from about 0.5 to about 80% by weight. Shear can be imparted to the smectite-type clay slurry by means of commercially available equipment that is known to impart high shear to the material. Illustrative of such equipment are a Manton-Gaulin Homogenizer available from the APV Gaulin Company. Representative processes for shearing clay slurries are described in U.S. Pat. No. 4,743,098, which is herein incorporated by reference.

The organic cations which are useful in this invention to make the organoclay component of this invention may be selected from a variety of nitrogen-based quaternary materials that are capable of exchanging cations with the selected smectite-type clay. The organic cations which are reacted with smectite-type clay to prepare the inventive organophilic clays have a positive charge localized on a single nitrogen atom within the compound.

One form of quaternary ammonium salts which are useful in making organoclays to be used with the invention hereof are those having the formula:

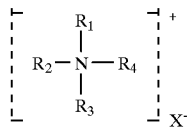

wherein $R_1$ comprises a lineal or branched aliphatic hydrocarbon group having from 1 to about 30 carbon atoms; $R_2$, $R_3$ and $R_4$ are independently selected from the group consisting of (a) lineal or branched aliphatic groups having from 1 to about 30 carbon atoms; (b) ethoxylated groups containing from 1 to about 80 moles of ethylene oxide; and (c) hydrogen; and $X^-$ comprises an anion, preferably chloride.

Typical quaternary compounds of the above type useful for the organoclay of the invention are methyl tri (hydrogenated tallow) ammonium chloride (M3Ht) and dimethyl di(hydrogenated tallow) ammonium chloride (2M2HT). These examples of suitable hydrophobic quaternary ammonium compounds to make organoclays.can be described chemically as follow:

Methyl tri(hydrogenated) tallow ammonium chloride (M3HT):

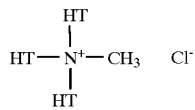

Dimethyl di(hydrogenated tallow) ammonium chloride (2M2HT):

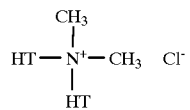

The raw materials used to make the quaternary amonium compounds can be derived from natural oils such as tallow, soya, coconut and palm oil. The aliphatic groups in the above formula may also be derived from other naturally occurring oils including various vegetable oils, such as corn oil, coconut oil, soybean oil, cottonseed oil, castor oil and the like, as well as various animal oils or fats.

The aliphatic groups may be petrochemically derived from, for example, alpha olefins. Representative examples of useful branched, saturated radicals included 12-methylstearyl and 12-ethylstearyl. Examples of useful aromatic groups, that is benzyl and substituted benzyl moieties, include materials derived from, e.g., benzyl halides, benzhydryl halides, trityl halides, α-halo-α-phenylalkanes wherein the alkyl chain has from 1 to 22 carbon atoms, such as 1-halo-1-phenyloctadecane, substituted benzyl moieties, such as those derived from ortho-, meta- and para-chlorobenzyl halides, para-methoxybenzyl halides, ortho-, meta- and para-nitrilobenzyl halides, and ortho-, meta- and para-alkylbenzyl halides wherein the alkyl chain contains from 1 to 22 carbon atoms; and fused ring benzyl-type moieties, such as those derived from 2-halomethylnaphthalene, 9-halomethylanthracene and 9-halomethylphenathrene, wherein the halo group comprises chloro, bromo, or any other such group which serves as a leaving group in the nucleophilic attack of the benzyl type moiety such that the nucleophile replaces the leaving group on the benzyl type moiety.

Useful quaternary ammonium salts for purposes of the instant invention also include hydrophobic quaternary ammonium salts, such as monomethyl trialkyl quaternaries and dimethyl dialkyl quaternaries, as well as hydrophilic quaternary ammonium salts, such as water-dispersible, ethoxylated quaternary ammonium compounds, and mixtures thereof.

Another group of organoclays useful are organoclays of the type previously discussed but, in addition, containing intercalated anions; see U.S. Pat. No. 4,517,112, for example, for a description of these types of products. In these materials one or more anions have been complexed with the quaternary amonium ion before, during, or after organoclay formation. Some representative anions useful for this application include citric acid, 12-amino dodecanonicate and tartaric acid.

The organic anion(s) optionally employed in the products of the invention may also be selected from a wide range of materials that are capable of reacting with the organic cations in order to form an organic cation/organic anion complex. The molecular weight of the organic anion is preferably 3,000 or less, and more preferably 1,000 or less, and contains at least one anionic moiety per molecule so as to permit the formation of the organic cation/organic anion complex which then becomes intercalated between the clay platelets. Preferred organic anions are derived from carboxylic acids, such as stearic acid, oleic acid, palmitic acid, succinic acid, tartaric acid, etc.; sulfonic acids; and alkyl sulfates, such as the lauryl half ester of sulfuric acid and mixtures thereof.

Also useful for this invention are quaternaries derived in whole or in part from organic acid-derived esters ("ester quats"). These types of organoclays are more completely described in presently pending U.S. patent application Ser. No. 08/621,932, now U.S. Pat. No. 5,718,841, assigned to the assignee hereof. The ester organic cation is provided by a quaternary ammonium compound selected from the group consisting of the following formulae:

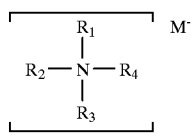

wherein $R_1$ is an alkyl or aralkyl-ester group having 8 to 30 carbon atoms as described below and $R_2$, $R_3$ and $R_4$ are independently selected from the group consisting of (i) $R_1$, (ii) long chain linear or branched alkyl (including methyl), aliphatic or aromatic groups having 1 to 30 carbon atoms (such groups can also include hydroxylated groups); (iii) aralkyl groups, which are benzyl and substituted benzyl moieties, including such groups having fused ring moieties having linear chains or branches of 1 to 30 carbon atoms; (iv) aryl groups such as phenyl and substituted phenyl including fused ring aromatic substituents; (v) beta, gamma unsaturated groups having six or less carbon atoms or hydroxyalkyl groups having 2 to 6 carbon atoms; and (vi) hydrogen. $M^-$ is an anion, typically chloride, methyl sulfate, acetate, iodide or bromide.

This quaternary ammonium compound must contain at least one linear or branched, saturated or unsaturated alkyl or aralkyl-ester $R_1$ group having 8 to 30 carbon atoms. Such ester groups are of the general formula:

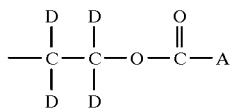

where each D is independently selected from the group consisting of H, $CH_3$ and $C_2H_5$ and A is an alkyl or aralkyl radical group.

As discussed above, the second important component of the present invention, component b) is a rheologically active polyamide.

In an important embodiment, this rheologically active polyamide is a polyamide ester comprising the reaction product of polycarboxylic acid, an active hydrogen compound, an alkoxylated active hydrogen compound, and a capping agent. This polyamide has been discovered to have a particularly important solubility factor which provides a soluability "tunnel", when combined with an organoclay, to the inventive composition.

The polycarboxylic acid used to make the polyamide should have at least 5 carbon atoms, preferably from 6 to 36 carbon atoms and most preferably from 16 to 20 carbon atoms per carboxylic acid group. While polycarboxylic acids having more than 2 carboxylic acid groups may be employed, the amount of such acids should be limited to avoid extensive cross linking.

Illustrative useful polycarboxylic acids include sebacic acid, poly(butadiene)dioic acids, dodecane dicarboxylic acid and mixtures thereof. Especially preferred polycarboxylic acids are oligomers of fatty acids having a carbon chain of from 16 to 22 carbon atoms, preferably 16 to 18 carbon atoms. Exemplary fatty acids are those derived from soybean oil, castor oil, tall oil, corn oil, cottonseed oil, kapok seed oil, linseed oil and mixtures thereof. Even further preferred are oligomers of fatty acids which are substantially comprised of the dimerized fatty acid. Typically, the dimerized fatty acid constitutes at least about 20% by weight of the oligomerized fatty acid, and preferably it is at least about 80% by weight of the oligomerized fatty acid.

Suitable oligomerized fatty acids are commercially available such as certain oligomerized fatty acids available under the name "Empol" from Emery Industries, a division of National Distillers & Chemical Corporation and "Sylvadym" available from Arizona Chemical Company.

The active hydrogen compound useful for the invention has the general formula $X_m$-R-$Y_n$ wherein R represents a group containing from 2 to 12 carbon atoms and which may contain non-reactive groups, such as ether, alkoxy or halogen groups, X and Y are independently selected from primary amino, secondary amino and hydroxyl and m and n are at least 1, the sum of (m+n) is at least 2, and preferably m and n are each 1. Preferably at least 50%, and more preferably at least 75%, and most preferably all of the X and Y groups participating in the reaction are primary amino, secondary amino or a mixture thereof. Preferably, R represents a group containing from 6 to 12 carbon atoms, and more preferably R represents a group containing from 6 to 8 carbon atoms.

The active hydrogen compound can have 3 or more active groups. However, the amount of active hydrogen compound having 3 or more active groups should not be selected such that the polyamide reaction produce is cross-linked to an extent such that it is insoluble in the environment of the liquid organic composition in which it is to be used in the inventive composition.

Illustrative useful active hydrogen compounds include polyamines, such as 1,2-diaminoethane, 1,2-0 and 1,3-diaminopropane, 1,4-diaminobutane, 1,6-diaminohexane, 1,8-diaminoctance, 1,12-diaminododecane, 3,3 -diaminopropyl-N-methyl-amine, N-alkyl- L,3 - diaminopropanes wherein the alkyl group is a long carbon chain such as coco or tallow alkyl, soya alkyl, oleyl, stearyl and mixtures thereof, and amino alcohols, such as ethanolamine, 6-aminohexanol, aminoethylethanolamine and mixtures thereof. Diols which may constitute a portion of the active hydrogen compound are exemplified by 1,2-ethanediol, 1,2- and 1,3-propane diol, 1,4-butane diol, 1,6-0 hexanediol, diethylene glycol, triethylene glycol and mixtures thereof.

Preferred active hydrogen compounds are diamines, especially diamines having from 6 to 12 carbon atoms, with the most preferred diamine being 1,6-diaminohexane.

The alkoxylated active hydrogen compound is a polyether segment (alkoxylated) moiety with at least 2 active hydrogen groups. The alkoxylated active hydrogen compound preferably has an active amine or hydroxyl moiety at each terminus of the polyether chain and/or has an end of the polyether chain linked to a central molecular fragment having at least one additional amine or hydroxyl moiety and/or polyether chain attached thereon. This definition includes alkoxylated polyols (polyalkylene glycols or polyalkylene diols) that have two hydroxyl end groups and contain ethylene, propylene, or butylene oxide units such as polyethylene glycol, polypropylene glycol or polybutylene glycol, respectively, with molecular weights of about 250 to 2000. Additionally adducts of an alkylene oxide and a difunctional reactant such as an alkanolamine (e.g., ethanolamine) are also useful; such adducts are also known as diol ethers or alkanol amine ethers. Also, suitable compounds which provide polyether segments include amine-terminated polyoxyethylenes of the formula:

$H_2N(CH_2CH_2O)_xH$ and $H_2N(CH_2CH_2O)_xCH_2CH_2NH_2$ where x ranges from about 10 to 50. Such compounds are commercially available under the tradename "Jeffamine."

Illustrative additional alkoxylated aliphatic nitrogen-containing compounds include those tertiary amines having one fatty alkyl group derived from various fatty sources having 12 to 18 carbon atoms and at least two polyoxyethylene or polyoxypropylene groups attached to the nitrogen. Polyethoxylated aliphatic amine polyols are commercially available and marketed by Akzo Chemicals, Inc. under the tradename "Ethomeen," while polyethoxylated aliphatic amides are available from the same company under the tradename "Ethomid."

As stated above with respect to the polycarboxylic acid and active hydrogen compound, the alkoxylated active hydrogen compound can also have 3 or more active groups. However, the amount of alkoxylated acitve hydrogen compound having 3 or more active groups should not be selected such that the reaction product is crosslinked to an extent such that it is insoluble in the environment of the organic composition in which it is to be used.

Illustrative alkoxylated aliphatic amines include those amines obtained from N-alkyl trimethylene diamines and having two polyoxyethylene groups attached to one nitrogen group. Such polyalkoxylated aliphatic diamines are commercially available and marketed by Akzo Chemicals, Inc. under the tradename "Ethoduomeen".

Preferred alkoxylated hydrogen compounds are polyethylene oxide glycols with molecular weights ranging from 100–1000 and alkoxylated aliphatic nitrogen-containing compounds.

The capping agent is used to terminate the reaction product of the polycarboxylic acid, the active hydrogen compound and the alkoxylated active hydrogen compound, and is preferably a monocarboxylic acid. The monocarboxylic acid generally has from 8 to 22 carbon atoms. It is preferred to have a monocarboxylic acid capping agent containing both unsaturation and hydroxylation moieties. Further preferred is a monocarboxylic acid capping agent with a single point of unsaturation (if aliphatic) or a single hydroxyl moiety. Most preferred is a monocarboxylic capping agent with a single point of unsaturation (if aliphatic) and a single hydroxyl moiety. The capping agent may also have a straight or branched chain. Illustrative unsaturated aliphatic acids include linoleic acid, linolenic acid, oleic acid, monocarboxylic acids derived from dehydrated castor oil, undecylenic acid, tall oil fatty acids, soya fatty acids, and mixtures thereof. Aromatic acids, such as benzoic acid, salicylic acid and mixtures thereof may also be employed as a portion of the total capping agent.

Hydroxylated monocarboxylic acids include ricinoleic acid, 12-hydroxystearic acid, 12-hydroxydodecanoic acid, and mixtures thereof. The preferred capping agent is ricinoleic acid.

The capping agent may be composed of a compound which is not a monocarboxylic acid which is unsaturated and/or hydroxylated. For example, the capping agent may be composed of at least one non-hydroxylated saturated aliphatic monocarboxylic acid which is unsaturated and/or hydroxylated. For example, the capping agent may be composed of at least one non-hydroxylated, saturated aliphatic monocarboxylic acid such as octanoic acid, nonanoic acid, dodecanoic acid, octadecanoic acid, docosanoic acid, hydrogenated tallow acids, stearic acid and mixtures thereof. Other examples of capping agents are monoixocyanates.

From the foregoing discussion, it can be understood that an especially preferred aspect of the present invention is a polyamide ester component which is the reaction product of an oligomer of fatty acid having a carbon chain of from 16 to 18 carbon atoms, a diamine having from 6 to 12 carbon atoms, an ethoxylated $C_{12}$-$C_{18}$ alkyl amine having 2 to 10 ethoxylated units, and an unsaturated and hydroxylated monocarboxylic acid having from 8 to 22 carbon atoms as the capping agent, with the most preferred capping agent being ricinoleic acid.

Other presently preferred compositions are the reaction product of (1) ricinoleic acid/1,6-hexamethylene diamine/C-36 dimer acid and ethoxylated [5] octadecylamine, and (2) ricinoleic acid/1,6-hexamethylene diamine/C-36 dimer acid and polyethylene oxide glycol M.W. 400.

The polyamide ester composition is believed to function via a pigment-rheological additive interaction, in harmony with the organoclay component, and the specific organic solvents used. The presence of the polar alkoxy moieties in the polyamide increases the pigment-rheological additive interaction in a coatings system, thereby increasing the ease of dispersion and lowering the energy (i.e., temperature) requirements for rheological incorporation into the coatings system.

The polyamide ester rheological additive may be prepared according to known techniques. For example, the reactants may be charged to a suitable reaction vessel which is equipped with a mechanical stirrer, a thermometer, a Dean-Stark trap equipped with a Bartlett modification and a nitrogen inlet. The vessel can be heated with stirring under a nitrogen blanket. After completion of the reaction, which can be determined by acid number (e.g., preferably less than about 25), the polyamide ester is cooled and is discharged.

The most preferred polyamide ester compounds are made using the following materials:

a) $C_{36}$ dimer Acid-1,6-hexamethylene diamine-ethoxylated (5) octadecylamine capped with ricinoleic Acid.

b) $C_{36}$ dimer Acid-1,6-hexamethylene diamine-polyethylene glycol (PEG) capped with ricinoleic Acid.

Commercial components include $C_{36}$ dimerized fatty acid Sylvadym T-18 available from Arizona Chemicals which contains 82% dibasic acid, 18% polybasic acids, and <1% monobasic acid. A useful polyoxyethlene (5) octadecylamine is available from Akzo Chemicals, Inc. under the tradename Ethomeen 18/15. A polyoxyethylene (5) cocamine (Ethomeen C/15) is available from Akzo Chemicals, Inc. A bis (2-hydroxyethyl) octoadecylamine Ethomeen 18/12 is available from Akzo Chemicals, Inc.

The third important constituent of the inventive pourable organophilic/polyamide composition is about 40 to 60 weight percent of one or more organic solvents selected from the group consisting of low molecular weight alcohols, that is those lower than 1000 molecular weight, such as n-propanol, and aromatic solvents such as toluene and mineral spirits.

While "pourable" and "pumpable" are terms resisting precise definitions, they are given a working definition in this application as follows (a) "Pourable" in general means that the product exhibits 75,000 cps viscosity or less at 77° F., a measured with a Brookfield RVT Micometer @ 50 rpm employing a #4 spindle. The choice of type and percentage of solvent depends on the desired viscosity of the thickening composition mixture. Typically, the viscosity of the pourable thickening composition mixture should be less than about 15,000–25,000 cps (at RPM with a Brookfield RVT viscometer) so that it will be readily pour from the storage container as a liquid or near liquid, and rapidly incorporate into the organic fluid system to be thickened at room temperature. Examples of products that are pourable include honey, molasses, and liquid dishwasher detergents.

(b) "Pumpable" products exhibit 200,000 cps or less in viscosity at 77° F. at the shear rate of the pump. Pumpable products would include pourable products. Pumpable substances could be non-pourable (above about 75,000 cps) under static conditions, but would drop to 15,000 cps or less under shearing, because of their shear thinning response. Examples of pumpable products would include: construction pastes and grouts, mayonaisse-type substances, and liquid shoe polishes.

The pumpable compositions prepared according to this invention may be used as rheological additives in non-aqueous compositions such as paints, varnishes, enamels, waxes, paint-varnish lacquer remover, oil base drilling. fluids, lubricating grease, inks, polyester resins, epoxy resins, mastics, adhesives, sealants, cosmetics, detergents, and the like. The inventive compositions of this invention can also be used in combination with other materials. The compositions can be dispersd into these systems by commonly known equipment, including medium speed dispersers, colloid mills, roller mills, and ball mills.

The invention also provides non-aqueous organic and solvent compositions thickened with the above-indicated pourable additive. Thus, an important aspect of the invention relates to an organic system which comprises:

(i) a liquid organic fluid composition such as paint, coatings, drilling fluids, ink or similar material; and
(ii) a pumpable organophilic clay/polyamide composition providing the liquid organic fluid composition with rheological properties comprising:
  a) from about 5 to 15 weight percent of an organophilicly modified smectite-type clay,
  b) from about 25 to about 35 weight percent of one or more defined rheologically active polyamides, and
  c) from about 40 to 50 weight percent of one or more organic solvents selected from the group consisting of n-propanol, toluene and mineral spirits.

The pourable organoclay/polyamide composition of the invention is added to organic fluid systems in an amount sufficient to obtain the desired rheological properties. Amounts of such inventive composition in the organic fluid compositions are from about 0.01% to 15%, preferably from about 0.5% to 6%, based on the total weight of the non-aqueous fluid system.

The following examples are given to illustrate the invention, but are not deemed to be limiting thereof. All percentages given throughout the specification are based upon weight unless otherwise indicated.

EXAMPLE 1

A soya alkyd enamel organic system was prepared using the below described components.

| Test System Formula | wt. |
|---|---|
| Soya Alkyd Resin (70% N.V.) | 70.0 |
| Mineral Spirits | 47.0 |
| Soya Lecithin | 11.0 |
| Rheological Additive (N.V.) | 6.0 |
| Titanium Dioxide (2101 or Equiv.) | 130.0 |
| Talc (Nytal 400) | 45.0 |
| Grind to 6.5 F.O.G., then letdown with: | |
| Soya Alkyd (70% N.V.) | 370.00 |
| Mineral Spirits | 160.00 |
| 24% Zr Nuxtra | 4.0 |
| 12% Co Nuxtra | 1.0 |
| 5% ca Nuxtra | 15.0 |
| ASA | 3.0 |
| Total | 862.00 |

EXAMPLE 2

Two inventive compositions made according to this invention were prepared using the following materials in the weight percentages shown:

| | Composition A | Composition B |
|---|---|---|
| Mineral Spirits | 35 | 35 |
| n-propanol | 25 | 25 |
| Organophilic clay made using hectorite and 2M2HT quaternary | 10 | |
| Organophilic clay made using hectorite and 3MHT quaternary | | 10 |
| Polyamide compound | 30 | 30 |
| | 100 | 100 |

The polyamide components was made respectively in Composition A using the reaction product of ricinoleic acid, 1,6-hexamethylene diamine, C-36 dimer acid and ethoxylated [5] octadecylamine, and in Composition B ricinoleic acid, 1,6-hexamethylene diamine, C-36 dimer acid and polyethylene glycol M.W. 400.

EXAMPLE 3

The two inventive compositions made in Example 2 were dispersed into the organic fluid system of Example 1 as rheological additives at a loading of 6 pounds inventive composition per 100 gallons of the organic fluid and a variety of tests well known as rheological measurements were made and recorded. To show the improvement of the invention hereof a variety of comparative control examples were used. Three organoclay controls were used at the same loading and were dispersed as dry powders into the organic fluid composition, with some effort, using shear-type dispersion apparatus. Claytone AF is a bentonite-organoclay made by Southern Clay Co. Bentone SD-1 is a bentonite-organoclay made using an anion modifier as well as a quaternary compound. Bentone A140 is a coarse bentonite-based organoclay.

| RHEOLOGICAL COMPONENT | BROOKFIELD 10 RPM, CPS/T.I. | LENETA SAG MILS | HEGMAN F.O.G. GRIND/POSTADD | VISC/SAG CPS/MILS |
|---|---|---|---|---|
| | | | | POSTADD @90F |
| Composition A | 12000/2.60 | 25 | 5.5A/5.5B | 6560/16.5 |
| Composition B | 11500/2.48 | 20 | 5.5A/— | —/— |
| BLANK, 0% R/A | 1800/1.3 | 6 | 5.5B/— | NOT MEASURED |
| CLAYTONE AF | 2900/1.67 | 9 | 5.5A/— | |
| BENTONE SD-1 | 2800/1.68 | 9 | 6.0B/— | |
| BENTONE A140 | 2960/1.84 | 11.5 | 6.0B/— | |

Discussion of results: Main test conclusions shown by the above are:

Brookfield, 10 RPM viscosity and thinning index (T.I) are greatly improved with Compositions A and B. This is due to the initial activation of the inventive composition that is superior to the efficiency gain of the DRT powder additions of the Claytone AF, Bentone SD-1 and Bentone A140.

Leneta Sag is substantially enhanced for the reasons similar to those discussed above.

Hegman F.O.G. are essentially the same showing no problem.

Post add data indicates significant efficiency over and above the dry addition of Claytone AF, Bentone SD-1 and Bentone A140 in the grind. A post add is highly desireable to some manufacturers.

EXAMPLE 4

The two inventive samples were dispersed into the soya alkyd enamel of Example 2 and stability tests were run at 1 and 2 weeks. This test involved the determination of Brookfield viscosity at 10 RPM and was measured in CPS. Separate samples were run where the system was maintained at room temperature during the 1 week period and at a high temperature of 140° F. The results were:

| | Initial Reading | 1 week room temperature | 1 week 140° F. | 2 week 140° F. |
|---|---|---|---|---|
| Composition A | 12000 | 11800 | 9000 | 9500 |
| Composition B | 11500 | 12400 | 9500 | 9500 |

Discussion of results:

The aged tests show a slight drop in viscosity (indicative of a stable system that wets out completely with time) with a relatively flat curve.

Dry powder rheological additive addition most often causes viscosity rise with time and oven aging due to incomplete initial activation of the rheological additive. If such viscosity rise is too great, the application properties can be negatively affected. The inventive composition are pronouncably superior to dry products in this regard.

What is claimed:

1. A liquid organic fluid system selected from the group consisting of paint, varnishes, sealants, adhesives, drilling fluids, waxes, greases and inks containing a pumpable organophilic clay/polyamide composition providing the liquid organic system with rheological properties where the organophilic clay/polyamide composition comprises;

1) from about 5 to 15 weight percent of an organophilicy modified smectite-type clay, 2) from about 25 to about 35 weight percent of one or more defined rheologically active polyamides wherein the rheologically active polyamide is a polyamide ester comprising the reaction product of polycarboxylic acid, an active hydrogen compound, an alkoxylated active hydrogen compound and a capping agent and, 3) from about 40 to 60 weight percent of one or more organic solvents selected from the group consisting of low molecular weight alcohols and aromatic solvents.

2. The liquid organic fluid system of claim 1, wherein said liquid organic fluid system is selected from the group consisting of oil base drilling fluids and polyester resins.

3. The liquid organic fluid system of claim 1 wherein the organophilic modified smectite-type clay is made from a smectite-type clay or clays selected from the group consisting of bentonite, hectorite and mixtures thereof.

4. The liquid organic fluid system of claim 1, wherein said pumpable organophilic clay/polyamide composition is present in an amount of about 0.01% to about 15% based on the total weight of said non-aqueous fluid system.

5. A liquid organic paint system comprising:

1) an organic liquid and 2) one or more organophilic clays which organophilic clay or clays comprises the reaction product of:

1) a smectite-type clay having a specific cation exchange capacity of about at least 75 milliequivalent per 100 grams of clay, 100% clay, active clay basis; and 2) a quaternary ammonium compound or compounds in an amount sufficient to satisfy at least 75% of said specified cation exchange capacity of the clay, and 3) one or more rheologically active polyamides comprising the reaction product of polycarboxlic acid, an active hydrogen compound, an alkoxylated active hydrogen compound and a capping agent.

6. The paint system of claim 5 wherein the organic liquid is selected from the group consisting of n-propanol, toluene and mineral spirits.

7. The paint system of claim 5 wherein the organophilic modified clay is made from a smectite-type clay or clays selected from the group consisting of bentonite, hectorite and mixtures thereof.

8. The paint system of claim 5 wherein the organophilic clay or clays and the one or more rheologically active polyamides are present in an amount of about 0.01% to about 15% based on the total weight of the paint system.

* * * * *